Sept. 11, 1956    L. BORG    2,762,966
SELF-EXCITED TRANSDUCTORS
Filed June 26, 1951

Inventor
Lennart Borg
By *Emos Aiken*
Attorney

United States Patent Office 2,762,966
Patented Sept. 11, 1956

2,762,966
SELF-EXCITED TRANSDUCTORS

Lennart Borg, Ludvika, Sweden, assignor to Allmanna Svenska Elektriska Aktiebolaget, Vasteras, Sweden, a corporation of Sweden Application June 26, 1951, Serial No. 233,650

Claims priority, application Sweden June 26, 1950

2 Claims. (Cl. 323—89)

The present invention relates to an improvement in transductors with self-excitation.

A common arrangement of a transductor of said kind having two cores consists in one winding on each core in series with a rectifying valve being connected in parallel with corresponding elements of the other core, said elements being inserted in an alternating current circuit. The load, the voltage of which is desired to be varied, is suitably connected in series with the transductor. The said rectifying valves shall be so arranged that they only admit one half period of the alternating current through one transductor winding and the opposite half period through the other one. Further windings on the transductor elements may be arranged in several ways to supply a pre-exciting controlling direct current to the transductor.

From a diagram showing the voltage across the load as a function of the excitation current of the transductor it appears that the curve is considerably steeper at transductors with self-excitation than at transductors without this form of excitation. A transductor of the first mentioned type may thus be utilized to give larger amplification than a transductor of the last mentioned type. The diagram also shows that for a transductor with self-excitation the voltage across the load amounts to a certain value at zero excitation current and continues to drop with increased negative excitation current until a minimum voltage is reached. It is thus necessary to apply a certain counter-excitation to obtain the lowest voltage across the load. This counter-excitation is usually supplied to the transductor by means of some excitation winding of the types mentioned above.

According to the present invention, however, a considerable improvement of the amplification ability of the self-excited transductor is obtained, and furthermore a considerable decrease of the lowest voltage supplied to the load without the use of any counter-excitation. The characteristic feature is that at least one of the transductor elements is arranged to be traversed by the current from a capacitor connected in parallel with said element, when said current is opposite to the direction of the rectifying valve.

Figure 1:
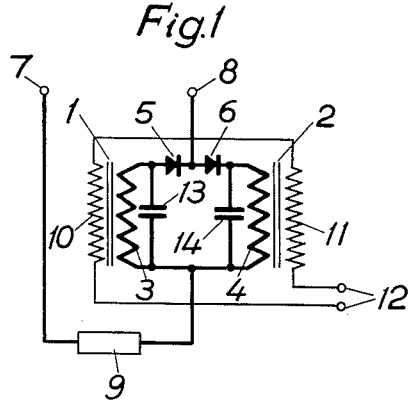
Figure 2:
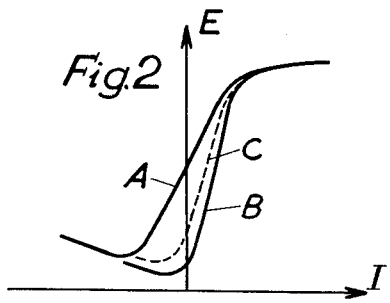

The invention will be further explained in connection with the accompanying drawing, in which Fig. 1 diagrammatically shows one form of the invention, and Fig. 2 shows a diagram of the voltage across the load as a function of the total excitation current of the transductor.

In Fig. 1, 1 and 2 designate two transductor elements, the alternating current windings 3, 4 of which, each one in series with a rectifying valve 5, 6, are connected in parallel in a circuit connected to an alternating current source at 7, 8, and in which a load 9 is connected in series with the transductor so constructed. Each one of the transductor elements is provided with an excitation winding 10, 11, both excitation windings being series-connected and fed from a direct current source at 12 via control members, not shown on the drawing, in the circuit from this source. According to the invention, the alternating current winding 3, 4 of each element is bridged by a capacitor 13, 14.

In the form shown, the modification may be made that only one capacitor 13 or 14 is arranged.

In the diagram according to Fig. 2, E represents the voltage across the load and the arrow I represents the positive excitation current. The curves A, B, C show the relation between said voltage and total operating excitation current. All curves concern transductors with self-excitation of the above mentioned type. The curve A represents a normal transductor of that kind without any capacitors 13, 14. The changed properties after connecting said capacitors are shown by the curves B and C for two different values for these capacitors. It is obvious from curve A that a certain counter-excitation must be applied to the transductor if it shall be possible to utilise it unto the lowest voltage, when the exciting ampere-turns balance each other. This means that the transductor must be provided with a separate winding for this purpose; i. e. a transductor according to Fig. 1, but without capacitors 13, 14, should require a further excitation winding except that 10, 11, shown in the figure.

As the costs for producing a transductor are highly dependent upon how many windings there shall be arranged on it, it is of great importance to be able to dispense with some of the windings. The equipment for feeding the excitation windings also requires rectifiers, and it is important to be able to dispense with one or more rectifiers. One advantage obtained by using a device according to Fig. 1 is that no winding is required for counter-excitation. It may be suitable to choose the capacity of the capacitor at least so large that at normal line frequency it is in resonance with the inductance of the transductor element in unsaturated condition. The minimum current of the transductor, when it is quite unsaturated, will then be appreciably diminished, and this effect is especially obvious at small loads. This has proved to be very advantageous in connection with current regulators to control the light output from electrical lamps. By this arrangement it is possible to extinguish also small lamps with a comparatively large current regulator, which has not been possible before with transductors of previously known kind without providing them with counter-excitation windings.

The mode of operation of the device according to Fig. 1 can be so explained that when the element 2 has finished to give current to the load 9 through the rectifying valve 6, a small excitation current will still traverse this element through the same valve in its operating direction. The voltage between the terminals 7 and 8 is applied across the element 2 and tends to decrease said excitation current. When this current has become zero, after a time determined by the inductance of the element in unsaturated condition, the voltage across the transductor has risen to a certain value. Owing to the capacitor 14, however, the excitation current is able to change direction, and the excitation current will charge the capacitor when the valve blocks. By this means the voltage consumption may be continued in the same way as if the transductor has had a counter-exciting negative excitation current. Owing to the use of said capacitor it is thus possible that the voltage drop across the transductor can be larger for a certain excitation current.

By choosing suitable values for the construction elements, it is thus possible to obtain the desired properties regarding amplification and lowest voltage without any additional windings for counter-excitation. The voltage depressing effect is partly dependent upon the effect of the capacitor analogous to phase compensation or parallel resonance.

I claim as my invention:

1. A self-excited transductor comprising at least two power windings on saturable cores, two half-wave rectifiers, capacitance means, two terminals for connecting the transductor to a load and to a source of alternating current, means for controlling the saturation of said cores, each of said power windings being connected in series with one of said half-wave rectifiers, the two said series-connections of one power winding and one half-wave rectifier being connected in parallel between said two terminals, the two half-wave rectifiers being oriented in opposite directions, and the capacitance means being connected in parallel to and directly across at least one of said power windings and being substantially in resonance with at least one of said power windings at the normal frequency of said alternating current source when said cores are unsaturated.

2. A self-excited transductor comprising at least two power windings on saturable cores, two half-wave rectifiers, two terminals for connecting the transductor to a load and to a source of alternating current, means for controlling the saturation of said cores, each of said power windings being connected in series with one of said half-wave rectifiers, the two said series-connections of one power winding and one half-wave rectifier being connected in parallel between said two terminals, the two half-wave rectifiers being oriented in opposite directions, and capacitors one connected in parallel to and directly across each of said power windings and being substantially in resonance with said power windings at the normal frequency of said alternating current source when said cores are unsaturated.

References Cited in the file of this patent

UNITED STATES PATENTS

| | | |
|---|---|---|
| 2,169,093 | Edwards | Aug. 8, 1939 |
| 2,473,592 | Klemperer | June 21, 1949 |
| 2,552,203 | Morgan | May 8, 1951 |

OTHER REFERENCES

"The Amplistat—A Magnetic Amplifier" by R. E. Morgan, Electrical Engineering, vol. 68, issue No. 8, pp. 663–667.